US010747594B1

(12) United States Patent
Wang et al.

(10) Patent No.: US 10,747,594 B1
(45) Date of Patent: Aug. 18, 2020

(54) SYSTEM AND METHODS OF ZERO-COPY DATA PATH AMONG USER LEVEL PROCESSES

(71) Applicant: VMware, Inc., Palo Alto, CA (US)

(72) Inventors: Wenguang Wang, Santa Clara, CA (US); Christoph Klee, Snoqualmie, WA (US); Adrian Drzewiecki, Cupertino, CA (US); Christos Karamanolis, Los Gatos, CA (US); Richard P. Spillane, Mountain View, CA (US); Maxime Austruy, Lausane (CH)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/256,713

(22) Filed: Jan. 24, 2019

(51) Int. Cl.
*G06F 9/54* (2006.01)

(52) U.S. Cl.
CPC .................................. *G06F 9/544* (2013.01)

(58) Field of Classification Search
None
See application file for complete search history.

(56) References Cited

U.S. PATENT DOCUMENTS

| | | | |
|---|---|---|---|
| 9,047,018 B1 * | 6/2015 | Ananthabhotla | |
| 9,542,112 B2 | 1/2017 | Drzewiecki et al. | |
| 9,760,493 B1 | 9/2017 | Wang | |
| 2002/0032844 A1 | 3/2002 | West | |
| 2004/0107419 A1 | 6/2004 | Blackmore et al. | |
| 2006/0167955 A1 * | 1/2006 | Vertes | |
| 2008/0155183 A1 | 6/2008 | Zhuang et al. | |
| 2009/0210635 A1 | 8/2009 | Blackmore et al. | |
| 2012/0054445 A1 | 3/2012 | Swart et al. | |
| 2012/0054447 A1 | 3/2012 | Swart et al. | |
| 2015/0026412 A1 | 1/2015 | Eads et al. | |
| 2016/0275042 A1 * | 9/2016 | Pathak | |

OTHER PUBLICATIONS

Johnson et al., "2Q: A Low Overhead High Performance Buffer Management Replacement Algorithm," Proceedings of the 20th VLDB Conference, Santiago, Chile, 1994, pp. 439-450.

(Continued)

*Primary Examiner* — Syed A Roni
(74) *Attorney, Agent, or Firm* — Patterson + Sheridan LLP

(57) ABSTRACT

The disclosure provides an approach for performing an operation by a first process on behalf of a second process, the method comprising: obtaining, by the first process, a memory handle from the second process, wherein the memory handle allows access, by the first process, to at least some of the address space of the second process; dividing the address space of the memory handle into a plurality of sections; receiving, by the first process, a request from the second process to perform an operation; determining, by the first process, a section of the plurality of sections that is to be mapped from the address space of the memory handle to the address space of the first process for the performance of the operation by the first process; mapping the section from the address space of the memory handle to the address space of the first process; and performing the operation by the first process on behalf of the second process.

20 Claims, 3 Drawing Sheets

(56) References Cited

OTHER PUBLICATIONS

EunYoung Jeong et al.; "Scalable user-level tcp stack for multicore systems." mTCP http://shader.kaist.edu/mtcp/. Last updated Apr. 4, 2014.

Thomas K. "User space networking fuels nfv performance." https://software.intel.com/en-us/blogs/2015/06/12/user-spacenetworking-fuels-nfv-performance, Jun. 12, 2015.

VFIO—virtual function i/o. https://www.kernel.org/doc/Documentation/vfio.txt, Date: Unknown.

Allan Bricker, Michel Gien, Marc Guillemont, Jim Lipkis, Douglas Orr, and Marc Rozier. A new look at microkernel-based unix operating systems: Lessons in performance and compatibility. In Proceedings of the EurOpen Spring 1991 Conference, Norway, Citeseer, 1991.

David Fiala, Frank Mueller, Christian Engelmann, Rolf Riesen, Kurt Ferreira, and Ron Brightwell. Detection and correction of silent data corruption for large-scale high-performance computing. In Proceedings of the International Conference on High Performance Computing, Networking, Storage and Analysis, SC '12, pp. 78:1-78:12, Los Alamitos, CA USA, 2012. IEEE Computer Society Press.

Bernd Panzer-Steindel. Data integrity. https://indico.cern.ch/event/13797/contributions/1362288/attachments/115080/163419/Data_integrity_v3.pdf, Apr. 2007.

Simon Peter, Jialin Li, Irene Zhang, Dan R. K. Ports, Doug Woos, Arvind Krishnamurthy, Thomas Anderson, and Timothy Roscoe. Arrakis: The operating system is the control plane. In 11th USENIX Symposium on Operating Systems Design and Implementation (OSDI 14), pp. 1-16, CO, Oct. 2014. USENIX Association.

\* cited by examiner

SYSTEM AND METHODS OF ZERO-COPY DATA PATH AMONG USER LEVEL PROCESSES

RELATED APPLICATIONS

This application is related to U.S. application Ser. No. 16/256,726, titled "CPU-EFFICIENT CACHE REPLACEMENT WITH TWO-PHASE EVICTION," filed on the same day as the present application, the entire contents of which is hereby incorporated by reference herein.

BACKGROUND

A computing device usually has multiple processes running on it, some of the processes being in kernel space and some in user space. Sometimes two user processes need to pass data between each other. However, the two user processes do not have access to one another's address space. One way to pass data between two user processes is for a kernel process to copy data of a first user process into the kernel process address space. The kernel process can then make a second copy of the kernel address space copy into the second user process. However, such data transfer from one user process to a second user process requires the creation of two additional copies of the data. Such "two-copy" data transfer uses a lot of resources of a computing device, and takes a significant amount of time to complete.

SUMMARY

Embodiments provide a method of performing an operation by a first process on behalf of a second process, the method comprising: obtaining, by the first process, a memory handle from the second process, wherein the memory handle allows access, by the first process, to at least some of the address space of the second process; dividing the address space of the memory handle into a plurality of sections; receiving, by the first process, a request from the second process to perform an operation; determining, by the first process, a section of the plurality of sections that is to be mapped from the address space of the memory handle to the address space of the first process for the performance of the operation by the first process; mapping the section from the address space of the memory handle to the address space of the first process; and performing the operation by the first process on behalf of the second process.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for exchanging data between two or more user-level processes without the need of creating a copy of that data, and without the need to use an intermediary kernel-level process to transmit data between the two or more user-level processes. The techniques described herein improve the functioning of the computer itself because increasing the speed of data exchange between components or processes of a computer improves the speed of execution of software in general on the computer.

Figure 1:
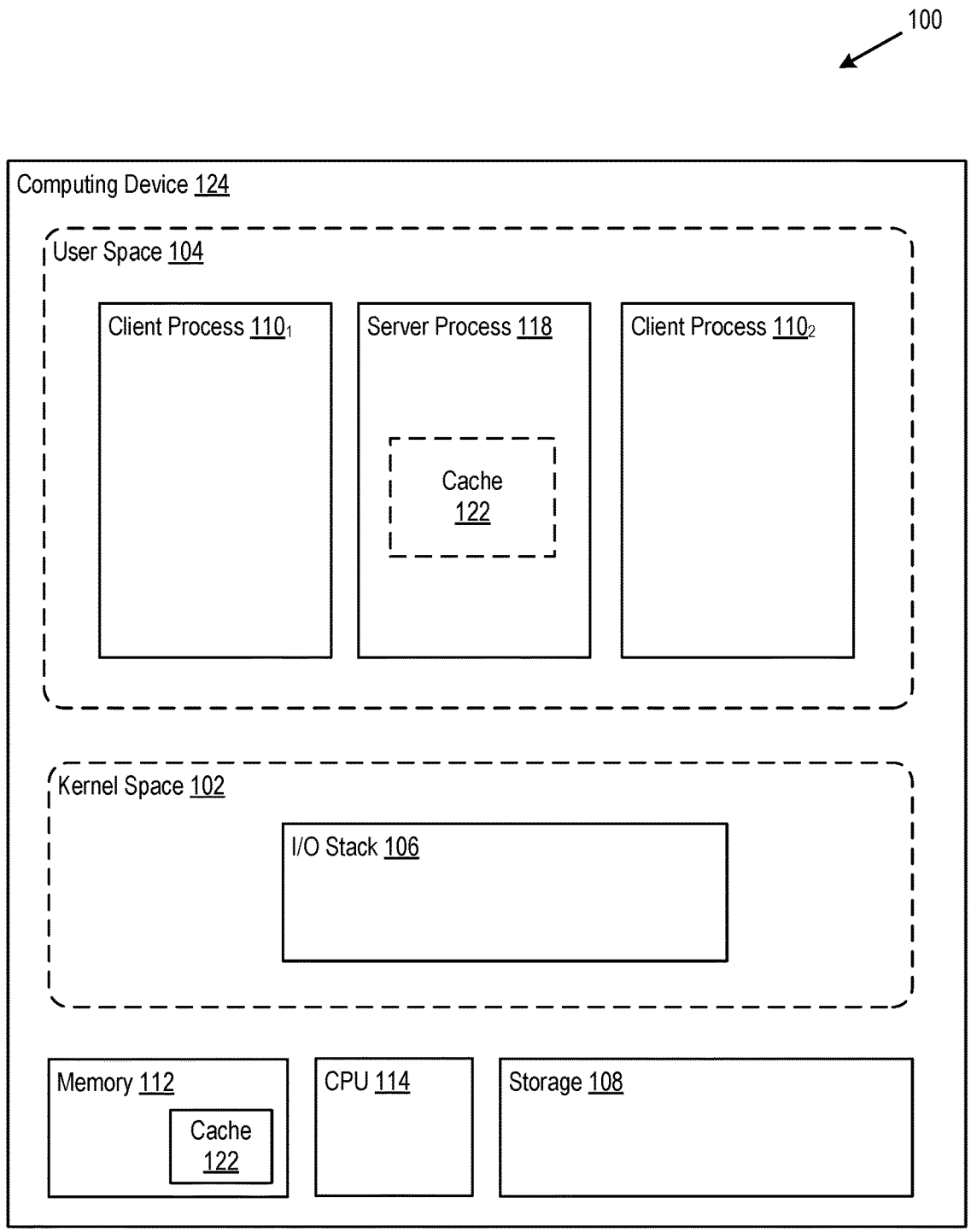
FIG. 1 depicts a block diagram of a computer system in which one or more embodiments of the present invention may be implemented.

FIG. 1 depicts a block diagram of a computer system 100 in which one or more embodiments of the present invention may be implemented. Computer system 100 includes a computing device 124.

Computing device 124 includes a memory 112, one or more processors (CPUs) 114, a storage 108, a user "space" or "level" 104, and a kernel "space" or "level" 102.

Storage 108 represents persistent storage devices (e.g., one or more hard disks, flash memory modules, solid state disks, and/or optical disks). Storage 108 may be internal to computing device 124, or may be external to computing device 124 and coupled via a host bus adapter (HBA) or network interface card (NIC) of computing device 124, such as over a network.

Memory 112 is hardware allowing information, such as executable instructions, configurations, and other data, to be stored and retrieved. Memory 112 is where programs and data are kept when CPU 114 is actively using them. Memory 112 may be volatile memory or non-volatile memory.

Kernel space 102 comprises software components and address spaces of those components that are part of a privileged operating system (OS) kernel of computing device 124. The address spaces may be virtual or physical, and correspond to addresses in memory 112. As known in the art, virtual memory is an abstraction of physical memory that gives a process 110/118 the illusion of having large or infinite memory available. Virtual memory addresses are mapped to physical memory addresses by page tables stored in memory 112.

In an embodiment, the OS kernel running on computing device 124 can be part of a conventional desktop OS, like Microsoft Windows, Mac OS, or Linux. In other embodiments, the OS kernel running on computing device 124 can be part of a native, or "bare metal," virtualization hypervisor, like VMware's ESX Hypervisor.

Kernel space 102 includes a kernel-level input/output (I/O) stack 106 that is configured to perform I/O with respect to a storage 108. Kernel space 102 can include components that are not shown, such as a memory management subsystem, a process scheduling subsystem, privileged device drivers, etc.

User space 104 comprises a plurality of user processes, such as $110_1$, $110_2$, and 118 that run outside of the OS kernel. Examples of such user processes include application programs, shared libraries, virtual machines (VMs), etc. In an embodiment, rather than connecting to hardware of computer system 100 through I/O stack 106, user processes 110/118 may connect to hardware of computer system 100 through single root input/output virtualization (SR-IOV)

technology. Processes 110 and 118, as well as any kernel level processes, execute on the one or more processors 114.

In FIG. 1, three user processes 110$_1$, 110$_2$, and 118 are shown, although any number of user processes may run concurrently. At least one of the user processes may be a server process 118, and one or more other processes may be client processes 110$_1$ and 110$_2$. Server process 118 comprises a cache 122, which is a portion of memory 112 corresponding to a portion of the virtual or physical memory address space of server process 118, as shown by the dotted lines of cache 122 within server process 118, and by the solid lines of cache 122 within memory 122. Cache 122 is discussed in more detail with reference to FIGS. 2 and 3, below.

In an embodiment, server processes 118 of computing device 124 are the only user processes with permission to perform I/O operations on storage 108, such as through I/O stack 106. In an embodiment, server process 118 has more privileges within computer system 100 than client processes 110$_1$ or 110$_2$. The privileges of server process 118 may arise from an administrative account that is associated with server process 118. The privileges of server process 118 may allow server process 118 to perform certain operations that client processes 110 may not have permission to do, such as I/O operations on storage 108 through I/O stack 106. Operations that server process 118 may have permission to perform, but a client process may not have permission to perform, may include some or all of the following: data read, data write, data compression, hash computation, deduplication, encryption, and checksum calculation.

Aside from permissions and privileges of user processes, it may be advantageous for server process 118 to perform the above operations rather than for a client process 110, because performing the above operations centrally allows for running of central algorithms, and the central algorithms may execute from a central location, such as server process 118. A central algorithm, as opposed to a distributed algorithm running on several processes such as client processes 110, is easier to create and is less error prone, resulting in an overall better-performing computer system 100.

In order for client process 110 to perform an I/O operation on storage 108 through server process 118, server process 118 needs to be able to obtain data from client process 110 and/or to be able to provide data to client process 110. Generally, each user process in user space 104 has its own memory space that is not directly accessible by other user processes. This feature, known as memory isolation, increases the stability and security of computing device 124, because a malicious or buggy user process cannot tamper with the memory (and/or other resources) owned by other user processes, or the OS itself.

As discussed in the Background section, one way for server process 118 to obtain/provide data to/from client process 110 is for a kernel process to act as an intermediary in transmitting data between user level processes. However, such transmission involves creating one or more copies of the data, which is inefficient. An improved method for server process 118 to exchange data with client process 110 is discussed with reference to FIGS. 2 and 3, below.

Figure 2:
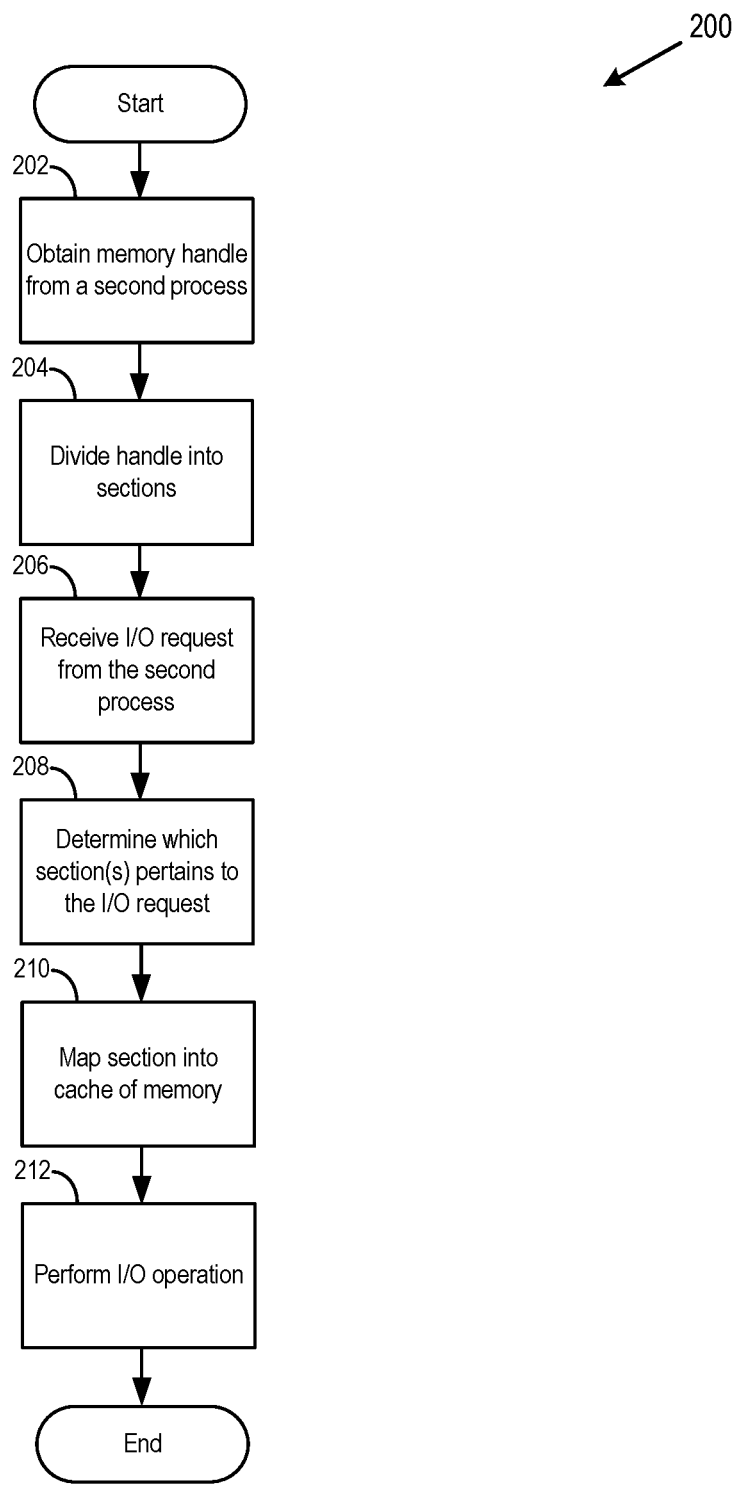
FIG. 2 depicts a flow diagram of a method of performing a zero-copy I/O operation by a server process on behalf of a client process, according to an embodiment.

FIG. 2 depicts a flow diagram of a method 200 of performing a zero-copy I/O operation by a server process 118 on behalf of a client process 110, according to an embodiment. Certain blocks of FIG. 2 are discussed with reference to FIG. 3. Method 200 may be performed by server process 118, optionally in conjunction with other components of computer system 100.

At block 202, server process 118 obtains a memory handle 304 (see FIG. 3) from a client process 110. Memory handle 304 may be obtained by server process 118 from client process 110 through the method described in FIG. 2 of U.S. Pat. No. 9,542,112, issued Jan. 10, 2017, the entire contents of which is incorporated by reference herein. As described in U.S. Pat. No. 9,542,112, memory handle 304 may be a file handle. Memory handle 304 represents some or all of the virtual or physical address space of a client process 110. Memory handle 304 allows server process 118 to interact with a portion of memory 112 corresponding to the address space of client process 110 as though that portion of memory 112 corresponding to the portion of address space of client process 110 were a file located within memory or storage of computing device 124. That is, a portion of memory 112 allocated to one user level process 110/118 is usually inaccessible to another user level process, for security purposes, but memory handle 304 allows one user level process 110/118 to access a portion of memory 112 allocated to another user level process 110/118 as though that portion were a file object, communicable using a file object interface.

Access to another user process's address space through a memory handle typically requires the use of buffers, which means that one or more copies of data are created during operations directed at the memory handle. In order to accomplish zero-copy memory sharing between user-level processes, some or all of the memory handle should be memory mapped onto the address space of the process that obtained the memory handle (e.g., onto the address space of server process 118). Because memory handle 304 might represent all or a large portion of the address space of client process 110, and because server process 118 may have obtained multiple memory handles 304 from multiple client processes 110, mapping the entire address space represented by every obtained memory handle 304 onto the virtual or physical address space of server process 118 may be infeasible or inefficient. Thus, the address space represented by memory handle 304 may be divided into sections 302 (see FIG. 3), each of which may be mapped separately, as described below.

At block 204, server process 118 divides the address space represented by the memory handle obtained at block 202 into sections 302. Exemplary sections 302 are shown in FIG. 3.

Figure 3:
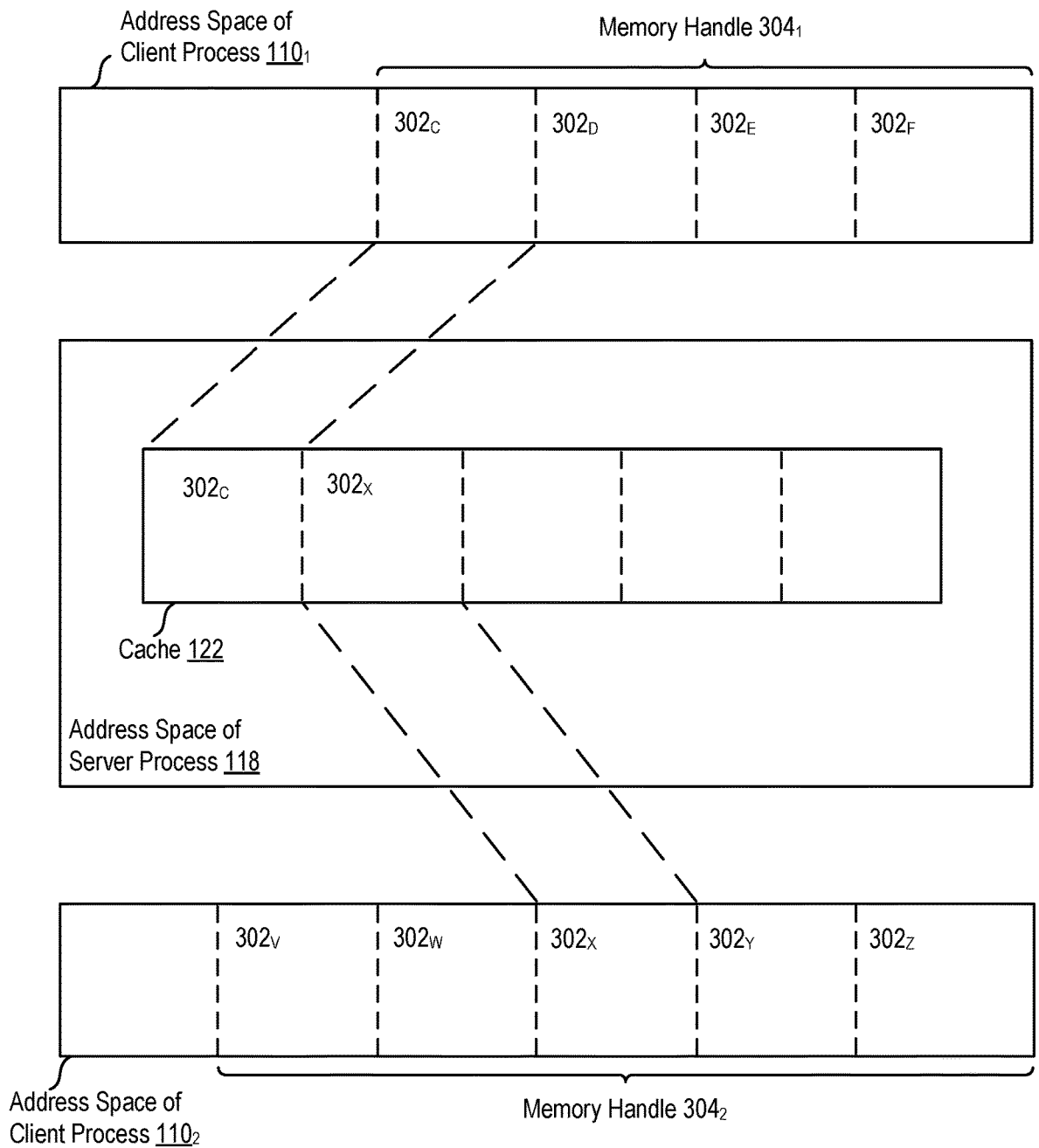
FIG. 3 depicts a block diagram of a mapping between (a) a section of an address space of a client process and (b) the address space of a server process, according to an embodiment.

FIG. 3 depicts a block diagram of one or more mappings between (a) sections 302 of address space of client processes 110 and (b) the address space of server process 118, according to an embodiment. The address space of client processes 110 and server process 118 may be a virtual address space or a physical address space. The portion of the address space of client process 110$_1$ that is divided into sections 302$_C$-302$_F$ is encompassed by exemplary memory handle 304$_1$. The portion of the address space of client process 110$_2$ that is divided into sections 302$_V$-302$_Z$ is encompassed by exemplary memory handle 304$_2$. As shown, one or more of sections 302 of each client process 110 is mapped onto cache 122. As described above, cache 122 is a portion of the address space of server process 118. Each section 302 may be of the same size, or the sizes of sections 302 may vary. A section 302 may be, for example, 100 megabytes (MB), 500 MB, 1 gigabyte (GB), 2 GB, or 5 GB in size.

Returning to FIG. 2, at block 206, server process 118 receives an input/output (I/O) operation request, such as an I/O operation directed at storage 108 or memory 112, from client process 110. Although block 206 is shown as occurring after blocks 202 and 204, block 204 may occur before one of or both blocks 202 and/or 204, or in parallel with block 202 or 204. For example, block 206 may be the first block of method 200, and may be the trigger for the initiation of method 200 and the execution of rest of the blocks of method 200. The I/O operation received at block 206 by server process 118 from client process 110 may be, for example, a read or write operation.

At block 208, server process 118 determines which section(s) 302 of memory handle 304 pertains to the I/O operation of block 206. For example, if the I/O operation is a write operation, then server process 118 determines which section 302 of memory handle 304 contains data that is to be written to the destination of the write operation. For another example, if the I/O operation is a read operation, then server process 118 determines into which section 302 of memory handle 304 the read data is to be written, and maps that part of memory from the client process into the address space of the server process. Usually, the server process 118 starts an I/O operation so that a storage controller of storage 108 or a remote storage directly puts data into section 302 of memory 112, the specific section 302 being indicated by server process 118. Because section 302 of memory 112 has been mapped from client process 110 to server process 118 through memory handle 304, the data read appears in the address space of client process 110 at the same time, without an additional copy of data being created within memory 112 reserved for client process 110. The session may be a Direct Memory Access (DMA) session or a Remote Direct Memory Access (RDMA) session, created through a network for remote storage. Functions of a storage controller may be performed by an RDMA card. An example of an intermediate copy is a copy created within a memory buffer, such as a read or write buffer.

At block 210, server process 118 maps (a) the one or more section(s) 302 determined to pertain (e.g., to contain data) to the I/O operation of block 206, and (b) the address space of server process 118. Specifically, server process 118 maps the section(s) 302 of memory handle 304 to cache 122 of the address space of server process 118. The mapping may be accomplished by, for example, the mmap call, which is a Portable Operating System Interface (POSIX)-compliant Unix system call. The mapping of a portion of client process 110 virtual address space to a portion of a server process 118 virtual address space, the client portion defined by memory handle 304, may be accomplished, for example, as follows. The mapping may be accomplished by mapping each virtual address in section 302 of the client process into server process 118 by making a portion (e.g., one or more page table entries) of the page table of server process 118 point to the portion of memory pages of client process 110 that is to be mapped to server process 118.

Mapping one or more sections 302 into the address space of server process 118 allows server process 118 to read or write data to/from mapped section 302 as though the mapped section 302 were part of the address space of server process 118. In this way, no intermediate copies, such as buffer copies, are created and/or needed when server process 118 performs an I/O operation on behalf of client process 110.

FIG. 3 shows an exemplary mapping between (a) cache 122 of server process 118 and (b) memory handles $304_1$ and $304_2$. FIG. 3 shows that section $302_C$ of address space of client process $110_1$ has been mapped into a first portion of cache 122, and that section $302_X$ of address space of client process $110_2$ has been mapped into a second portion of cache 122. FIG. 3 assumes that more than one memory handle 304 has been obtained by server process 118, and server process 118 is performing I/O operations on behalf of more than one client process 110.

Cache 122 may utilize a standard cache algorithm for unmapping (i.e., evicting) mappings between sections 302 and cache 122, once cache 122 becomes full. The cache algorithm may be, for example, first-in-first-out, last-in-first-out, least recently used, most recently used, random replacement, or another cache algorithm. In an embodiment, the cache algorithm used is the clock algorithm described in U.S. Pat. No. 9,760,493, issued Sep. 12, 2017, the entirety of which is hereby incorporated herein. In another embodiment, the cache algorithm is the algorithm described in U.S. application Ser. No. 16/256,726, titled "CPU-EFFICIENT CACHE REPLACEMENT WITH TWO-PHASE EVICTION," incorporated by reference above. For the evicting or unmapping, server process 118 may use, for example, the munmap call, which is a POSIX-compliant Unix system call.

It should be noted that establishing a mapping from one address space to another is expensive in terms of resources of computing device 124, so it is useful for the mappings to be as long-lived as possible. This is the reason that cache 122 is utilized. If mapping of address spaces were not expensive, then rather than utilizing a cache, server process 118 could map section 302 of client process 110 into the server address space before performing an I/O operation, and then unmap after completion of the I/O operation without attempting to preserve the mapping.

At block 212, server process 118 performs the I/O operation received at block 206, the operation being performed by server process 118 on behalf of requesting client process 110. For example, in response to a read operation, server process 118 may read data from storage 108 and then write that data into the mapped section 302 for the use of client process 110.

It should be understood that, for any method described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments.

By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of performing an operation by a first process on behalf of a second process, each of the first and second processes having an address space, the method comprising:
   obtaining, by the first process, a memory handle from the second process, the memory handle comprising an address space that represents at least a portion of the address space of the second process;
   dividing the address space of the memory handle into a plurality of sections;
   receiving, by the first process, a request from the second process to perform an operation;
   determining, by the first process, a section of the plurality of sections that is to be mapped from the address space of the memory handle to the address space of the first process for performing the operation by the first process;
   mapping the section from the address space of the memory handle to the address space of the first process; and
   performing the operation by the first process on behalf of the second process.

2. The method of claim 1, wherein the first process is a server process and the second process is a client process residing in a user-level space of a computing device.

3. The method of claim 1, wherein each of the address spaces of the first and second processes is one of a virtual memory address space or a physical memory address space.

4. The method of claim 1, wherein the address space of the first process comprises a cache portion of a memory of a computing device, wherein mapping the section comprises mapping the section to the cache portion.

5. The method of claim 4, wherein a cache algorithm used for the mapping is one of first-in-first-out, last-in-first-out, least recently used, most recently used, random replacement, or clock algorithm.

6. The method of claim 1, wherein the operation is one of a read or a write operation.

7. The method of claim 1, wherein the mapping is performed using a system call of an operating system.

8. A non-transitory computer readable medium comprising instructions to be executed in a processor of a computer system, the instructions when executed in the processor cause the computer system to carry out a method of performing an operation by a first process on behalf of a second process, each of the first and second processes having an address space, the method comprising:
   obtaining, by the first process, a memory handle from the second process, the memory handle comprising an address space that represents at least a portion of the address space of the second process;
   dividing the address space of the memory handle into a plurality of sections;
   receiving, by the first process, a request from the second process to perform an operation;
   determining, by the first process, a section of the plurality of sections that is to be mapped from the address space of the memory handle to the address space of the first process for performing the operation by the first process;
   mapping the section from the address space of the memory handle to the address space of the first process; and
   performing the operation by the first process on behalf of the second process.

9. The non-transitory computer readable medium of claim 8, wherein the first process is a server process and the second process is a client process residing in a user-level space of a computing device.

10. The non-transitory computer readable medium of claim 8, wherein each of the address spaces of the first and second processes is one of a virtual memory address space or a physical memory address space.

11. The non-transitory computer readable medium of claim 8, wherein the address space of the first process comprises a cache portion of a memory of a computing device, wherein mapping the section comprises mapping the section to the cache portion.

12. The non-transitory computer readable medium of claim 11, wherein a cache algorithm used for the mapping is one of first-in-first-out, last-in-first-out, least recently used, most recently used, random replacement, or clock algorithm.

13. The non-transitory computer readable medium of claim 8, wherein the operation is one of a read or a write operation.

14. The non-transitory computer readable medium of claim 8, wherein the mapping is performed using a system call of an operating system.

15. A computer system comprising:
   a computing device;
   a memory of the computing device;
   a first process running on the computing device and having a first address space;
   a second process running on the computing device and having a second address space; and
   a processor, wherein the processor is programmed to carry out a method of performing an operation by the first process on behalf of the second process, the method comprising:
      obtaining, by the first process, a memory handle from the second process, the memory handle comprising an address space that represents at least a portion of the second address space of the second process;
      dividing the address space of the memory handle into a plurality of sections;
      receiving, by the first process, a request from the second process to perform an operation;
      determining, by the first process, a section of the plurality of sections that is to be mapped from the address space of the memory handle to the first address space of the first process for performing the operation by the first process;
      mapping the section from the address space of the memory handle to the first address space of the first process; and
      performing the operation by the first process on behalf of the second process.

16. The computer system of claim 15, wherein the first process is a server process and the second process is a client process residing in a user-level space of a computing device.

17. The computer system of claim 15, wherein each of the first address space of the first and the second address space of the second process is one of a virtual memory address space or a physical memory address space.

18. The computer system of claim 15, wherein the first address space of the first process comprises a cache portion of a memory of a computing device, wherein mapping the section comprises mapping the section to the cache portion.

19. The computer system of claim 18, wherein a cache algorithm used for the mapping is one of first-in-first-out, last-in-first-out, least recently used, most recently used, random replacement, or clock algorithm.

20. The computer system of claim 15, wherein the mapping is performed using a system call of an operating system.

* * * * *